June 17, 1958
C. E. OHLHEISER
2,839,644
APPARATUS FOR DETERMINING HUMIDITY
CONDITIONS IN MATERIALS
Original Filed Nov. 3, 1948
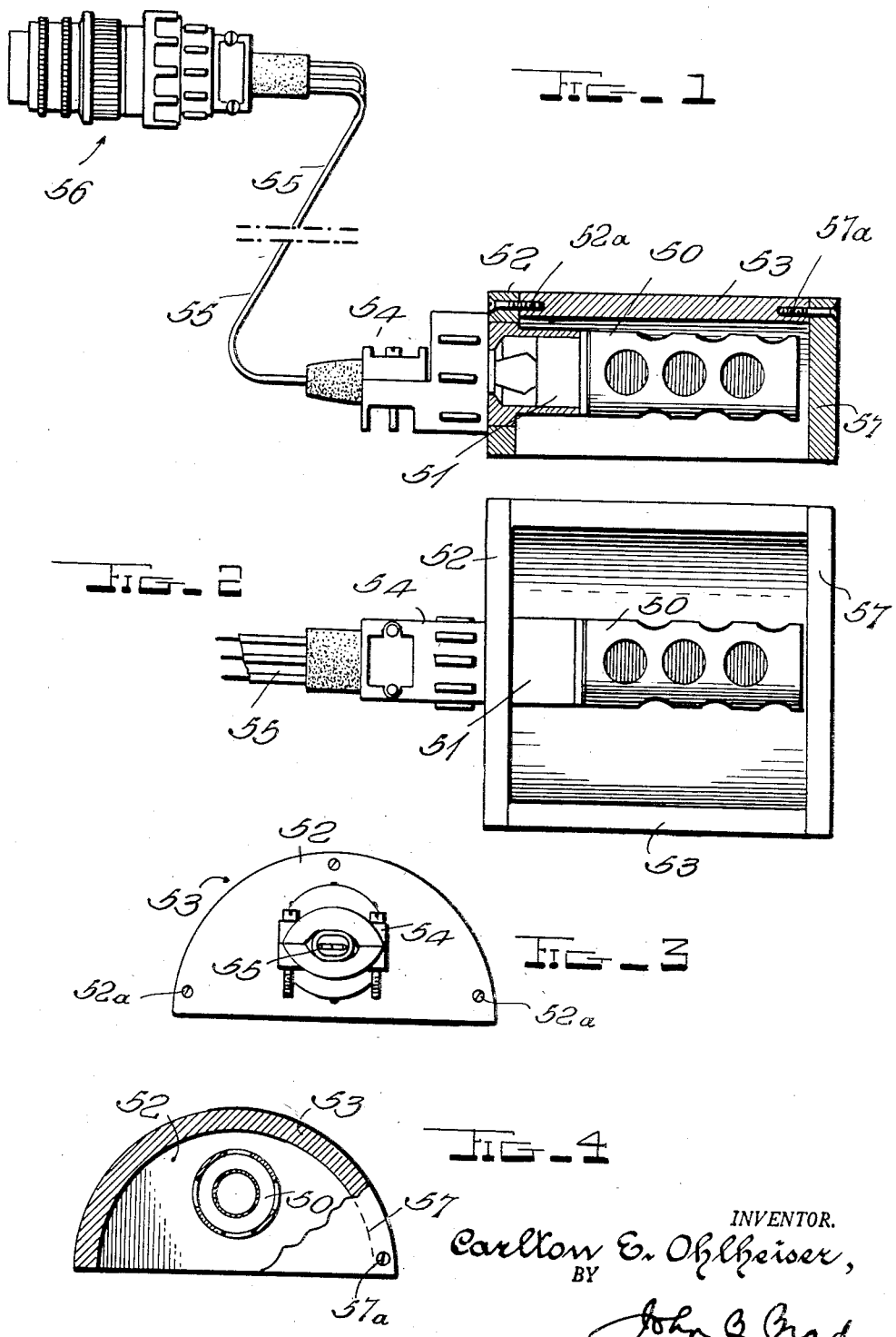
INVENTOR.
Carlton E. Ohlheiser,
BY
John C. Brady
ATTORNEY

United States Patent Office 2,839,644
Patented June 17, 1958

2,839,644

APPARATUS FOR DETERMINING HUMIDITY CONDITIONS IN MATERIALS

Carlton E. Ohlheiser, Silver Spring, Md., assignor to The American Instrument Company, Silver Spring, Md., a corporation of Maryland Original application November 3, 1948, Serial No. 58,146, now Patent No. 2,655,734, dated October 20, 1953. Divided and this application October 16, 1953, Serial No. 386,499

5 Claims. (Cl. 201—63)

My invention relates broadly to humidity control systems, and more particularly to an apparatus for the precision control of humidity in materials.

This application is a division of my application Serial Number 58,146, filed November 3, 1948, for Apparatus for Controlling Humidity Conditions in Bulk Materials, now Patent 2,655,734, dated October 20, 1953.

One of the objects of my invention is to provide a system responsive to conditions of humidity existent in material such as grain, soap, granular bromides, malt, and other confined materials.

Another object of my invention is to provide control means for maintaining grain and other granular materials at proper conditions of humidity for preservation of the grain or granular material, and the prevention of spoilage thereof.

Another object of my invention is to provide a construction of humidity sensing device having a casing adapted to confine a sampled quantity of air within which the moisture content is to be determined.

Still another object of my invention is to provide a construction of humidity sensing element which is arranged within a semi-cylindrical casing forming a semi-cylindrical housing around a humidity sensing element and within which the humidity sensing element may be removably mounted in a position for determining the humidity condition within a sampled quantity of air enclosed by the housing.

Other and further objects of my invention reside in the construction of an apparatus for maintaining material under conditions of substantially constant humidity, as set forth more fully in the specification hereinafter following, by reference to the accompanying drawings, in which:

Fig. 1 is a schematic view of the humidity sensing device embodying my invention.

Fig. 2 is a plan view looking at the bottom of the humidity sensing device of Fig. 1.

Fig. 3 is an end view of the humidity sensing device of Figs. 1 and 2.

Fig. 4 is an opposite end view of the humidity sensing device of Figs. 1 and 2 partially broken away to show the humidity sensing device therein.

Referring to the drawings in detail:

The humidity sensing element is represented at 50 removably mounted in the socket 51 disposed in the end wall 52 of the housing 53. The housing 53 is constituted by a substantially semi-cylindrical casing having substantially semi-circular end plates detachably connected through screws 52a and 57a with the ends thereof. Connection is established with the terminals of sockets 51 through the electrical connector fitting 54 connected through the moisture-proof cable 55 with the fitting 56 which may establish connection with the complementary shaped coupling leading to an indicator or the fitting 56 may connect directly with a complementary shaped fitting carried by indicator equipment. The housing 53 is closed at its remote end 57 opposite the end 52 which supports socket 51 and constitutes a housing within which conditions of humidity in a confined space may be determined.

I have found this type of humidity sensing device particularly adaptable for determining humidity conditions in soap, granular bromides, and foundry sand. I have termed this particular form of humidity sensing device is the Hygro-Cel. When it is desired to determine whether or not a material is in moisture equilibrium with surrounding conditions, the Hygro-Cel and its indicator are used in the following manner:

A humidity-sensing element is selected which will provide readings of the moisture in the surrounding air. The element is inserted in the Hygro-Cel housing which is then placed in contact with the surface of the material undergoing test, whether it be a piece of paper, foundry mold, soap, etc. When the Hygro-Cel is brought in contact with the material, the air space enclosed by the housing becomes isolated from the surrounding air because the open side of the housing is in contact with the material. The water vapor pressure within the Hygro-Cel and the water vapor pressure in the material under test will tend to come into equilibrium, which will cause a change in the relative humidity of the air within the Hygro-Cel. Moisture changes in this atmosphere as small as 0.15% relative humidity can be detected readily.

"Up scale" changes in indicator meter readings denote evaporation of moisture from the material; "down scale" changes indicate absorption of moisture by the material being tested.

Speed of response, accuracy, and broad range make the Hygro-Cel suitable, in many instances, for measuring moisture content by weight in solid materials.

With the humidity sensing device placed in contact with a sand mold surface, for example, the evaporation of moisture is readily detectable. Since sand molds are porous, moisture evaporating from the surface is a relatively true indication of the moisture present throughout the entire depth of the mold. Therefore, the readings taken on the mold's surface provide a quick indication of the condition of the mold. The humidity sensing element has proven so sensitive that it is possible to detect moisture changes as small as 0.1 percent relative humidity. The humidity sensing element 50 in contact with the mold sand converts the electrical resistance of the sensing element into terms of relative humidity. Experience in determining moisture conditions in molding sand has shown that if a rise in relative humidity above atmospheric conditions is indicated within thirty seconds after the instrument has been placed in contact with the mold, then the mold contains too much moisture for safe pouring. The sand mold is usually tested at several points on its surface, since all sections of the mold do not dry at the same rate.

A mold which is sufficiently dry for pouring will cause the relative humidity within the Hygro-Cel housing to rise only a few scale divisions after 30 seconds of contact with the mold. In contrast to this a mold which contains too much moisture will cause the relative humidity indication to rise possibly 30 scale divisions or more within 30 seconds after the instrument is placed on the mold to obtain a test reading.

I have found the apparatus of my invention highly practical in the protection of materials and in the determination of the characteristics thereof, and while I have described my invention in certain of its preferred embodiments, I realize that modifications and changes may be made, and I desire that it be understood that no limitations upon my invention are intended other than may be imposed by the scope of the appended claims.

What I claim as new and desire to secure by Letters Patent of the United States is as follows:

1. A humidity sensing device comprising a substantially semi-cylindrical casing open at one side thereof and terminating in substantially semi-circular end plates conforming in contour with said substantially semi-cylindrical casing, and forming a substantially semi-cylindrical housing, a socket mounted in one of said end plates, a humidity sensing element of the electrical winding type extending longitudinally of said housing and supported in said socket and electrical connections extending exteriorly of said housing and connected with said socket for establishing electrical connections to the electrical winding of said humidity sensing element, said semi-cylindrical housing being spaced from said humidity sensing element sufficiently to allow the accumulation of air completely around the humidity sensing element for measurement of the average humidity conditions within the area of the open side of said housing.

2. A humidity sensing device as set forth in claim 1 in which the electrical connections extending exteriorly of said housing terminate in a fitting exterior to one of the end plates of said housing on the end of a moisture-proof cable that connects to said socket within said housing.

3. A humidity sensing device as set forth in claim 1 in which said humidity sensing element has a length sufficient for said element to removably fit between said said socket in one of said end plates and the opposite end plate.

4. A humidity sensing device as set forth in claim 1 in which at least one of said end plates is detachably connected to the end of said semi-cyclindrical casing.

5. A humidity sensing device as set forth in claim 1 in which both of said end plates are detachably connected to the ends of said substantially semi-cylindrical casing.

References Cited in the file of this patent

UNITED STATES PATENTS

| | | |
|---|---|---|
| 1,711,574 | Miller | May 7, 1929 |
| 2,027,268 | Davis | Jan. 7, 1936 |
| 2,283,927 | Howe | May 26, 1942 |
| 2,299,299 | Bills | Oct. 20, 1942 |
| 2,342,553 | Olpin | Feb. 22, 1944 |
| 2,367,561 | Bouyoucos | Jan. 16, 1945 |
| 2,534,279 | Liberthson | Dec. 19, 1950 |
| 2,655,734 | Ohleiser | Oct. 20, 1953 |